United States Patent
Lee et al.

(10) Patent No.: US 11,955,888 B2
(45) Date of Patent: Apr. 9, 2024

(54) DC-DC CONVERTER WITH INTELLIGENT CONTROLLER

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Jong Wan Jo, Suwon-si (KR); Min Young Kim, Suwon-si (KR); Dong Soo Park, Suwon-si (KR); Kyung Duk Choi, Suwon-si (KR); Young Gun Pu, Suwon-si (KR)

( * ) Notice: Subject to any disclaimer, the term of this patent is extended or adjusted under 35 U.S.C. 154(b) by 471 days.

(21) Appl. No.: 17/367,359

(22) Filed: Jul. 3, 2021

(65) Prior Publication Data
US 2022/0052606 A1 Feb. 17, 2022

(30) Foreign Application Priority Data
Aug. 12, 2020 (KR) .................. 10-2020-0101414

(51) Int. Cl.
*H02M 3/158* (2006.01)
*G05B 13/02* (2006.01)
(Continued)

(52) U.S. Cl.
CPC .......... *H02M 3/158* (2013.01); *G05B 13/027* (2013.01); *H02M 1/0009* (2021.05); *H02M 1/08* (2013.01); *H02M 1/38* (2013.01)

(58) Field of Classification Search
CPC ...... H02M 3/158; H02M 1/0009; H02M 1/08; H02M 1/38
See application file for complete search history.

(56) References Cited

U.S. PATENT DOCUMENTS

| 2012/0044392 A1* | 2/2012 | Takenaka ............... H04N 25/68 348/246 |
| 2021/0175800 A1 | 6/2021 | Lee et al. |
| 2022/0083114 A1* | 3/2022 | Schwabe ............ H02M 1/0025 |

FOREIGN PATENT DOCUMENTS

| CN | 108199600 A | 6/2018 |
| KR | 10-1945620 B1 | 2/2019 |

(Continued)

OTHER PUBLICATIONS

Preliminary Examination Report dated Sep. 25, 2020 for Korean Application No. 10-2020-0101414.
(Continued)

*Primary Examiner* — Adolf D Berhane
*Assistant Examiner* — Afework S Demisse
(74) *Attorney, Agent, or Firm* — Insight Law Group, PLLC; Seung Lee

(57) ABSTRACT

As inputs of a controller of a direct current (DC)-DC converter are sampled for a predetermined time and thus two-dimensional state information in which one axis is an input physical quantity and the other axis is a time is generated, the two-dimensional state information is processed by a convolutional neural network to determine and output one of a plurality of control signals. An artificial intelligence control part may operate in accordance with a plurality of operation conditions or dynamically determined operation conditions by applying different artificial intelligence engines according to operation modes.

9 Claims, 7 Drawing Sheets

(51) Int. Cl.
- *H02M 1/00* (2006.01)
- *H02M 1/08* (2006.01)
- *H02M 1/38* (2007.01)

(56) References Cited

FOREIGN PATENT DOCUMENTS

| KR | 10-2135873 B1 | 7/2020 |
|---|---|---|
| WO | 2016/096887 A1 | 6/2016 |
| WO | 2019/207399 A1 | 10/2019 |

OTHER PUBLICATIONS

Farkhanda Aziz et al., A Novel Convolutional Neural Network-Based Approach for Fault Classification in Photovoltaic Arrays, IEEE Power & Energy Society Section, vo.8,pp. 41889-41904(Feb. 28, 2020).

Tae-Young Yoon et al., Wide Range of Ouput Voltage Controllable Dual Mode PWM/PFM DC-DC Buck Converter, Proceedings of the Korean Society of Electronic Engineering Conference pp. 184-185(Nov. 30, 2018).

Notice of Allowance dated Dec. 11, 2020 from Korean Industrial Property Office for Korean Application No. 10-2020-0101414.

European Search Report dated Dec. 16, 2021 from the European Patent Office for European Application No. 21185023.5.

\* cited by examiner

DC-DC CONVERTER WITH INTELLIGENT CONTROLLER

CROSS-REFERENCE TO RELATED APPLICATION(S)

This application claims priority from Korean Patent Application No. 10-2020-0101414, filed on Aug. 12, 2020, in the Korean Intellectual Property Office, the disclosure of which is incorporated herein by reference in its entirety.

BACKGROUND

1. Field

A technology related to a power supply device is disclosed.

2. Description of Related Art

Conventionally, a direct current (DC)-DC converter controls a duty of a switching pulse to supply a stable voltage even when input power or an output load fluctuates. Demands from a system with a built-in DC-DC converter become more and more complex and harsh in specifications such as voltage stability, a settling time, an output ripple, power transfer efficiency, a device size, load current coverage, the number of output voltages, and the like. In response to these demands, in a recent DC-DC converter, a frequency of a switching pulse varies or a multi-core structure is adopted. A controller of the conventional DC-DC converter acts over a limited input range in each output condition. A case in which algorithms of this controller are sequentially executed to satisfy and control a plurality of output conditions causes difficulty in achieving a target characteristic or a time delay due to interference between the output conditions.

Meanwhile, the DC-to-DC converter is optimized for an operating state of a load or demanded conditions from the load, for example, demanded conditions such as a change in an output voltage, an increase in an output current, a stable voltage, and the like. However, when the demanded conditions from a single load system dynamically change, the response thereto has been considerably limited.

Further, when a power management device is implemented as one integrated circuit, conventional DC-DC conversion devices promote improvement of energy transfer efficiency using a maximum power point tracking technique. According to this technique, a feedback control mode or a core size is controlled according to whether a load is a light load or a heavy load. Since this approach pursues optimal efficiency in a limited state, existing accumulated information cannot be considered or a processing speed limitation or a limitation in which a fixed amount of time is required due to repetition of always the same control flow is accompanied. Specifically, since numerous output parameters such as efficiency, a settling time, an output fluctuation (ripple), and the like cannot be simultaneously considered and processed and are sequentially considered, a time required for one control loop is fixedly increased in proportion to the number of considered output parameters.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description is directed to achieving control capable of delivering maximum power while optimizing efficiency, a settling time, and an output ripple in response to a demand from a load in a direct current (DC)-DC converter.

Further, the following description is directed to providing a DC-DC converter capable of satisfying a demanded condition of a load for a plurality of output parameters.

Further, the following description is directed to providing a DC-DC converter capable of satisfying a demanded condition of a load over a wide range of the output parameters.

Further, the following description is directed to providing a fully integrated DC-DC converter capable of minimizing surrounding elements.

Further, the following description is directed to providing a DC-DC converter capable of satisfying a dynamically changing demanded condition of a load.

According to one aspect of the present disclosure, as inputs of a controller of a DC-DC converter are sampled for a predetermined time and thus two-dimensional state information in which one axis is an input physical quantity and the other axis is a time is generated, the two-dimensional state information is processed by a convolutional neural network to determine and output one of a plurality of control signals.

According to an additional aspect, the control signal output to the DC-DC converter by an artificial intelligence control part may be an increase or decrease signal for a value of a current control signal.

According to an additional aspect, the artificial intelligence control part may operate in accordance with a plurality of operation conditions or dynamically determined operation conditions by applying different artificial intelligence engines according to operation modes.

According to an additional aspect, the operation mode may be determined according to the two-dimensional state information generated from a sensor input during a sampling window period.

According to an additional aspect, one of a plurality of artificial intelligent networks may be selectively applied to the artificial intelligence control part according to whether the two-dimensional state information generated from the sensor input during the sampling window period has been previously learned.

Other features and aspects will be apparent from the following detailed description, the drawings, and the claims.

Figure 1:
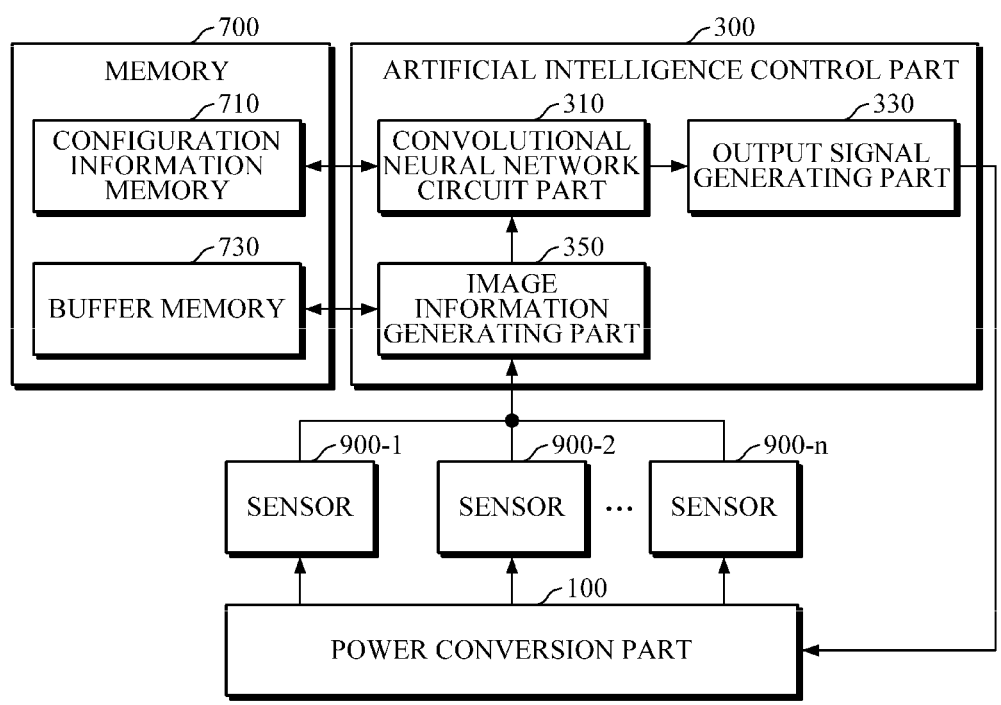
FIG. 1 is a block diagram illustrating a configuration of a direct current (DC)-DC conversion apparatus according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects are specified through embodiments described with reference to the accompanying drawings. It is understood that the components of each embodiment may be variously combined within the embodiment or with components of the other embodiment without other mentions or contradiction with each other. Terms used in the specification and claims should be interpreted as means and a concept consistent with a description or proposed technical spirit based on the principle that the inventor may appropriately define the concept of terms to describe the invention thereof in the best way. Hereinafter, preferable embodiments of the present disclosure will be described in detail with reference to the accompanying drawings.

FIG. 1 is a block diagram illustrating a configuration of a direct current (DC)-DC conversion apparatus according to one embodiment. As shown in the drawings, the DC-DC conversion apparatus according to one embodiment includes a power conversion part 100, a plurality of sensors 900, and an artificial intelligence control part 300.

The power conversion part 100 may be one of numerous known DC-DC converters such as a buck converter, a boost converter, a buck-booster converter, a complex structure or a multi-core structure including these basic structures, a structure including a plurality of these structures in parallel, and the like. These may operate in one of a pulse width modulation (PWM) method and a pulse frequency modulation (PFM) method. In one embodiment, the power conversion part 100 may be implemented as one semiconductor integrated circuit. When the DC-DC converter is implemented as the one integrated circuit, there is an issue of reducing a size of an inductor. When a switching frequency is increased to reduce the size of the inductor, stability becomes a problem in a feedback loop, a problem of a size of a resistor or capacitor used for compensation occurs, and an output ripple and a settling time increase, and thus efficiency is deteriorated. The present disclosure may be applied to efficiently solve these complicated controller problems.

The plurality of sensors 900 may be a circuit composed of one element or a plurality of elements connected to one node or a plurality of nodes of each input, output, or circuit of the power conversion part 100 to sense a physical state or a circuit state.

The artificial intelligence control part 300 samples values output from the plurality of sensors 900 many times for a predetermined time to generate two-dimensional state information and process the two-dimensional state information by a convolutional neural network (CNN), thereby outputting a plurality of control signals which control an operation of the power conversion part according to classified result values The input data of a general artificial neural network composed of fully connected layers is a one-dimensional vector. Generally, the convolutional neural network proposes a structure which may use this fully-connected artificial intelligent network while maintaining spatial information which includes features of a two-dimensional image. The convolutional neural network includes a convolution layer including filters which extract features of an image, a nonlinear activation function, and a pooling layer which extracts a characteristic from the output. A one-dimensional vector is generated from an output of the final pooling layer, and the one-dimensional vector is supplied as an input of a fully connected artificial intelligent network which will be described later.

Like the above, generally, the convolutional neural network (CNN) may reflect the features of the two-dimensional image to classify the features by a general artificial intelligent network. Physical quantities of inputs of a controller of the DC-DC converter, for example, an input terminal voltage, an output terminal voltage, a temperature, and the like may vary in number, type, or range according to the configuration of the DC-DC converter and target operation specifications or characteristics. These do not have a two-dimensional arrangement and do not have characteristics of the spatial information such as the image information.

Further, outputs of the controller of the DC-DC converter, for example, a duty, frequency, or the like of a switching pulse, may also vary in number, type, or range according to the configuration of the DC-DC converter and target operation specifications or characteristics. These are determined by reflecting the temporally accumulated characteristics of the inputs and thus may not be determined by classifying the inputs of the controller at one point in time.

According to one aspect of the present disclosure, two-dimensional state information, in which one axis is an input physical quantity and the other axis is a time, is generated by sampling the inputs of the controller of the DC-DC converter for a predetermined time, and the two-dimensional state information is processed by the convolutional neural network to generate the plurality of control signals. The inputs of the controller are physical quantities related to an environment or signals of the DC-DC converter, and thus may have continuous characteristics, and according to this aspect of the present disclosure, the output of the controller may reflect input values for a predetermined time or predetermined period.

In one embodiment, the artificial intelligence control part 300 may be implemented with program instruction sets executed in a general-purpose processor configured in the same substrate or the same package as the power conversion part 100. These program instructions are stored in a memory 700. In the illustrated embodiment, the memory 700 may be implemented as one or a plurality of physical memory elements. As another example, the artificial intelligence control part 300 may be implemented by a combination of dedicated hardware, a field programmable gate array (FPGA), and a general-purpose processor.

According to an additional aspect, the control signal output to the DC-DC converter by the artificial intelligence control part may be an increase or decrease signal for a value of a current control signal. According to this aspect, the artificial intelligence control part of the present disclosure serves to determine whether to increase or decrease the current control signal from input values during a predetermined period, that is, a sampling window. The control signal of the DC-DC converter may have a gradual influence on the output or characteristics according to an increase or decrease of the physical quantity, such as a duty, a frequency, a size or capacity of a gate driver, and a size of a coder. The artificial intelligence control part may gradually change the characteristics with respect to a current state and reduce a risk according to noise or errors included in the input or false judgment of an artificial intelligence engine by having the form of an increase or decrease signal for the current value.

As shown in the drawings, in one embodiment, the artificial intelligence control part 300 may include an image information generating part 350, a convolutional neural network circuit part 310, and an output signal generating part 330.

Figure 4:
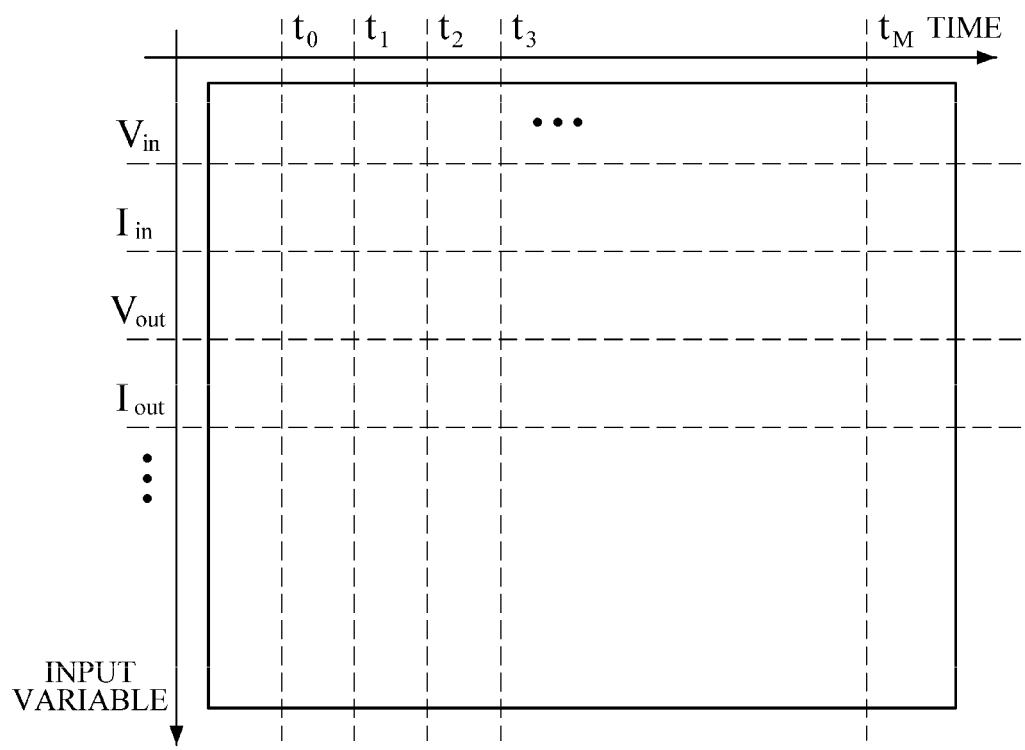
FIG. 4 illustrates an example of two-dimensional state information which is an input of a convolutional neural network.

The image information generating part 350 samples the values output from the sensors 900 for a predetermined time to generate the two-dimensional state information. The image information generating part 350 sequentially stores digital values read from the sensors 900 in a buffer memory 730. In one embodiment, the buffer memory 730 is implemented as a static random-access memory (RAM) implemented in the same package as the power conversion part 100 and the artificial intelligence control part 300. FIG. 4 illustrates an example of the two-dimensional state information generated by the image information generating part 350 and input to the convolutional neural network. A lateral axis is a time axis and a longitudinal axis is input variables. It may be advantageous to process the convolutional neural network when the input variables are physically disposed adjacent to each other having similar temporal fluctuation. In this example, a size of the sampling window is $(t_M-t_0)$.

The convolutional neural network circuit part 310 processes the two-dimensional state information to output the classified result values. The convolutional neural network circuit part 310 outputs a probability value for each classification result, but in the present disclosure, only one classification result value having the highest probability is selected. According to one aspect of the present disclosure, the convolutional neural network circuit part 310 determines and outputs one of a plurality of sets of control signals from input values during a predetermined period, that is, a sampling window. For example, the output of the convolutional neural network circuit part 310 may have the following form.

TABLE 1

| | |
|---|---|
| core selection word | 2 bits (00,01,10) |
| PWM/PFM selection word | 1 bit {0 (PWM) or 1 (PFM)} |
| duty control word | 4 bits |
| switching frequency control word | 2 bits |

In this example, the core selection word is a control word which selects one of a plurality of cores when a power converter has a multi-core structure. For example, when the power converter has a structure including three cores, the core selection word may be a 2-bit word capable of having one of {00, 01, and 10} in the order of a small core to a large core.

The PWM/PFM selection word is a control word which selects an operation mode of the power converter as one of a PWM method and a PFM method. For example, the PWM/PFM selection word may be a 1-bit word which indicates a PWM mode in the case of zero and which indicates a PFM mode in the case of one.

The duty control word designates a duty value of a PWM switching pulse of the power converter. For example, when the power converter has a structure capable of varying the duty in 16 steps, the duty control word may be a 4-bit word.

The switching frequency control word is a control word which controls the switching frequency of the power converter. For example, an exemplary power converter may include a reference frequency generating circuit and a multiplex reference frequency generating circuit composed of dividers which generate and output four switching frequencies by dividing a generated reference frequency signal, and a multiplexer to which the four switching frequencies are input and having a 2-bit selection input terminal to which the switching frequency control word is applied.

In the case of the embodiment in Table 1, the output of the convolutional neural network circuit part 310 is composed of 9 bits, which is a sum of 2 bits of the core selection word, 1 bit of the PWM/PFM selection word, 4 bits of the duty control word, and 2 bits of the switching frequency control word, and the input two-dimensional state information is classified into one of 3×2×16×2=192 classes.

The output signal generating part 330 generates and outputs the control signals which control the operation of the power conversion part 100 from the classification result values. For example, in the case of the example shown in the above-described Table 1, the output signal generating part 330 separates control words from the output 9 bits of the convolutional neural network circuit part 310 to output the control word to corresponding nodes of the power conversion part 100.

According to an additional aspect, as another embodiment, the convolutional neural network circuit part 310 may be configured to determine whether to increase or decrease each current control signal from input values during the predetermined period, that is, the sampling window. In this case, each control word may be a 1-bit word which refers to an increase or decrease, or a signed binary word which refers to an increase or decrease value, for example, a 3-bit signed binary word.

When each control word consists of a 1-bit word meaning an increase or decrease, the output of the convolutional neural network circuit part 310 is composed of 4 bits which is a sum of 1 bit of the core selection word, 1 bit of the PWM/PFM selection word, 1 bit of the duty control word, and 1 bit of the switching frequency control word and the input two-dimensional state information is classified into one of 2×2×2×2=16 classes.

In this embodiment, the output signal generating part 330 generates and outputs the control signals which control the operation of the power conversion part 100 from the classification result values. For example, in the case of the above-described embodiment, the output signal generating part 330 separates control words from the output 4 bits of the convolutional neural network circuit part 310 and increases or decreases the stored current control signal value according to the corresponding output value to output the control word to the corresponding nodes of the power conversion part 100. The output signal generating part 330 may operate to maintain the output value when the current control signal value is the maximum value and the corresponding output value is "an increase (1)." Further, the output signal generating part 330 may operate to maintain the output value when the current control signal value is the minimum value and the corresponding output value is "a decrease (0)." In this case, in the illustrated embodiment, the current control signal value may be stored in the memory 700.

The convolutional neural network circuit part 310 is learned with labeled learning data. Commercially available circuit design tools provide simulation results close to real circuits. In the present disclosure, the learning data is obtained from the simulation results while variously changing input parameters in a modeling of the power conversion part 100 generated by the circuit design tool. The two-dimensional filter of the convolutional neural network and weighting coefficients of the fully-connected artificial intelligent network determined through learning may be stored in a configuration information memory 710 of the memory 700. In one embodiment, the configuration information memory 710 is implemented on the same static RAM constituting the buffer memory 730.

Figure 2:
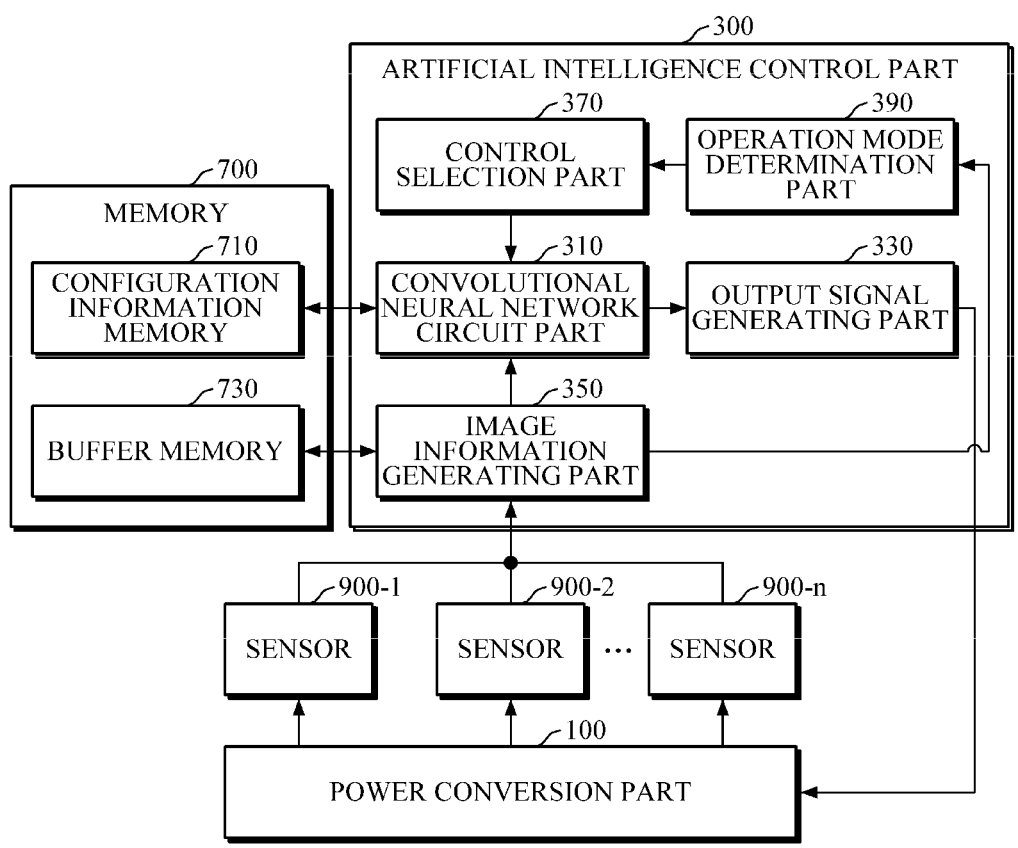
FIG. 2 is a block diagram illustrating a configuration of a DC-DC conversion apparatus according to another embodiment.
Figure 5:
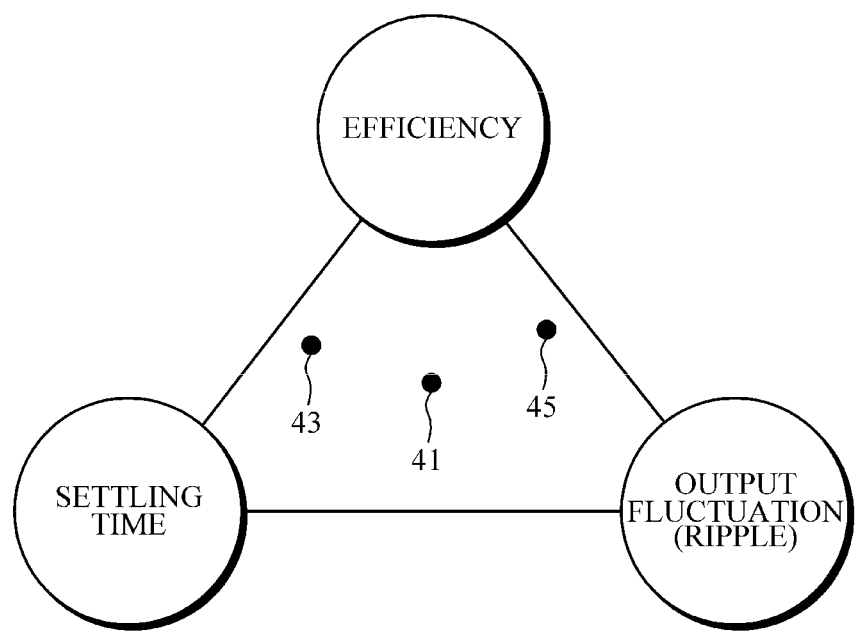
FIG. 5 is a conceptual diagram for describing a process of preparing a plurality of sets of two-dimensional filters and artificial neural network weighting coefficients according to a design goal.

FIG. 2 is a block diagram illustrating a configuration of a DC-DC conversion apparatus according to another embodiment. According to an additional aspect, the DC-DC conversion apparatus may further include a control selection part 370. The control selection part 370 applies a set of corresponding two-dimensional filters and artificial neural network weighting coefficients from the configuration information memory 710 to the convolutional neural network circuit part 310 in response to a setting instruction. In one embodiment, the setting instruction may be manually input through an operation mode indication button. To this end, a plurality of sets of the two-dimensional filters and the artificial neural network weighting coefficients are prepared and stored in the configuration information memory 710. Each set may be prepared according to predetermined design goals. FIG. 5 is a conceptual diagram for describing a process of preparing the plurality of sets of two-dimensional filters and artificial neural network weighting coefficients according to a design goal. In the drawing, efficiency refers to a ratio of output power to input power, and a settling time is a time required for the output to reach and maintain within a predetermined fluctuation range for a step-wave input voltage, and an output fluctuation (ripple) refers to a fluctuation range of the output voltage. The illustrated example presents these three design target parameters, but more design target parameters may be considered in the expanded embodiment. Points 41, 43, and 45 indicated in the drawings refer to weights in which these design target parameters are considered during design. A design goal of reference numeral 41 is a design plan which considers all three of efficiency, a settling time, and an output fluctuation to a uniform degree. Reference numeral 43 is a design plan in which the efficiency and the settling time receive the same weight and a weight of the output fluctuation is set to a small value. Reference numeral 45 is a design plan in which the efficiency and the output fluctuation receive the same weight and the weight of the settling time is set to a small value The weight of this design goal may be implemented through labeling of the learning data of the convolutional neural network. For example, the design target parameters are obtained through circuit simulation, and the classification result value corresponding to the input parameters which meet the desired design goals are assigned by changing the input parameters such as duty/core selection/frequency and the like in a state of input/output fluctuation in a way like FIG. 4 through the sensors.

According to an additional aspect, the DC-DC conversion apparatus according to one aspect may further include an operation mode determination part 390. The operation mode determination part 390 determines an operation mode from the outputs of the plurality of sensors 900 and outputs the setting instruction. For example, when fluctuation of the output voltage becomes severe due to sudden fluctuation of a load, the setting instruction may be output to select an operation mode optimized to reduce the fluctuation range of the output voltage. Further, when a stable load condition is maintained for a long time, the setting instruction may be output to select an operation mode optimized for efficiency.

Figure 3:
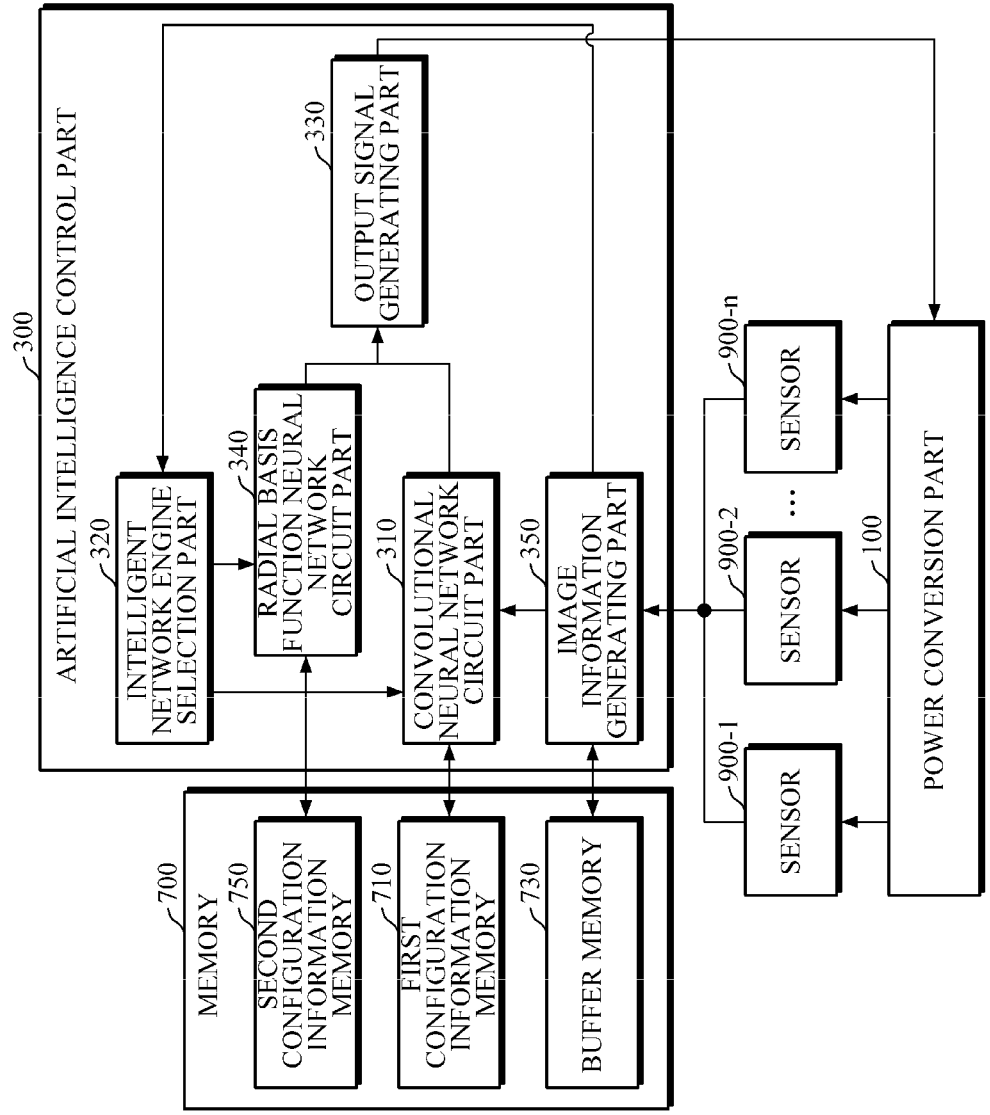
FIG. 3 is a block diagram illustrating a configuration of a DC-DC conversion apparatus according to still another embodiment.

FIG. 3 is a block diagram illustrating a configuration of a DC-DC conversion apparatus according to still another embodiment. As shown in the drawings, the DC-DC conversion apparatus according to an additional aspect may further include a radial basis function neural network (RBFNN) circuit part 340 and an intelligent network engine selection part 320.

The radial basis function neural network circuit part 340 is an artificial neural network using a radial basis function as an activation function. The output is a linear combination of neuron parameters and radial basis function values of the input values. The radial basis function neural network circuit part 340 may read and initialize the neuron parameters from a second configuration information memory 750. The intelligent network engine selection part 320 controls so that the generated two-dimensional state information is processed by a radial basis function neural network when the generated two-dimensional state information is previously learned state information, and the generated two-dimensional state information is processed by the convolutional neural network when the generated two-dimensional state information is new state information.

Figure 6:
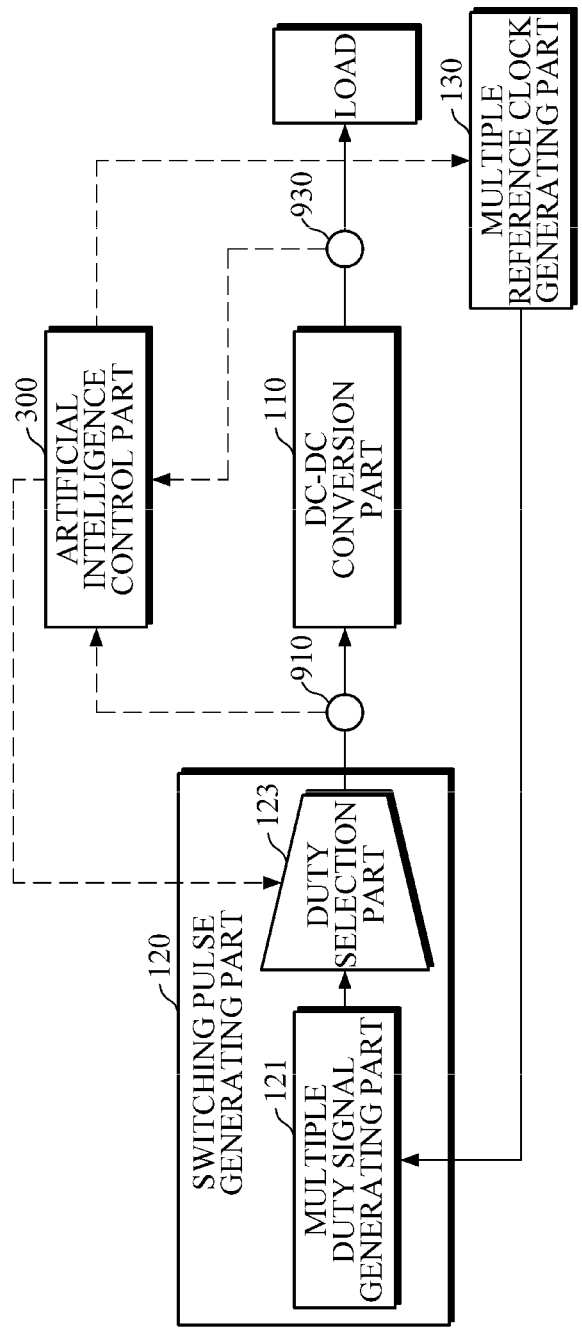
FIG. 6 is a block diagram illustrating a configuration of one embodiment of the DC-DC conversion apparatus to which an artificial intelligence control part according to the present disclosure is applied.

FIG. 6 is a block diagram illustrating a configuration of one embodiment of the DC-DC conversion apparatus to which the artificial intelligence control part according to the present disclosure is applied. The DC-DC conversion apparatus of the embodiment is disclosed as one of embodiments of U.S. Pat. No. 2,135,873, filed on Dec. 10, 2019 and registered on Jul. 14, 2020 by the present applicant. In this patent, a conventional rule-based controller is applied. A cited block diagram is an embodiment to which an artificial intelligence controller of the present disclosure is applied based on the embodiment shown in FIG. 3 of this patent publication. In order to simultaneously satisfy the output fluctuation or settling time, a fixed time on a control process flow is required, but as the present disclosure is applied, a control period may be shortened and thus performance may be improved.

As shown in the drawings, a power supply device according to an embodiment includes a multiple reference clock generating part 130, a switching pulse generating part 120, and a DC-DC conversion part 110. The multiple reference clock generating part 130 outputs one of a plurality of reference clock signals having different frequencies. For example, the multiple reference clock generating part 130 may generate reference clock signals having ten frequencies with intervals of 100 KHz interval at a frequency of 1 MHz-1.9 MHz. One of the generated reference clock signals is selected and output. As another example, the multiple reference clock generating part 130 may include a single clock generating circuit which generates and outputs a reference clock signal having an indicated frequency. For example, the reference clock may be divided and output through a controllable variable divider.

The switching pulse generating part 120 generates and outputs a switching pulse obtained by changing a duty of the reference clock signal output from the multiple reference clock generating part 130. The DC-DC conversion part 110 switches the input power by the switching pulse output from the switching pulse generating part 120 and then converts the input power to DC power and outputs the DC power. In one embodiment, the DC-DC conversion part 110 may be a buck converter. The switching pulse generating part 120 generates and outputs a switching pulse in which the duty of the reference clock is changed. PWM modulation, which modulates the input clock signal to have a given duty, is a known technique. The duty may be indicated through a voltage or digitally encoded information.

The switching pulse generating part 120 may include a multiple duty signal generating part 121 and a duty selection part 123. The multiple duty signal generating part 121 generates a plurality of switching pulse signals in which the reference clocks are modulated to have different duties. In one embodiment, the multiple duty signal generating part 121 includes nine signal generating parts which output switching pulse signals having a duty of 10% to 90% while being respectively synchronized with the reference clock signal. A technique for PWM modulation of the input pulse signal to have a given duty is a well-known technique.

The duty selection part 123 outputs one signal selected by a duty control signal output from the artificial intelligence control part 300 among the plurality of switching pulse signals. In one embodiment, the duty selection part 123 is a multiplexer. In the illustrated embodiment, a selection input of the multiplexer is a digital byte output from a duty tracking control part 193. The DC-DC conversion part 110 switches the input power by the switching pulse and then converts the input power to a DC voltage and outputs the DC voltage. In one embodiment, the DC-DC conversion part 110 may be a buck converter.

In the illustrated embodiment, the control signals output from the artificial intelligence control part 300 include a duty control signal and a switching frequency control signal. The duty control signal is input as the selection input of the multiplexer constituting the duty selection part 123. The switching frequency control signal is input to the multiple reference clock generating part 130 to select a frequency of the reference clock supplied to the switching pulse generating part 120. For example, the switching frequency control signal may be input as a control word of a variable divider of the multiple reference clock generating part 130. Since a specific operation of the embodiment shown in FIG. 7 is described in detail in this patent publication, a detailed description will be omitted.

Figure 7:
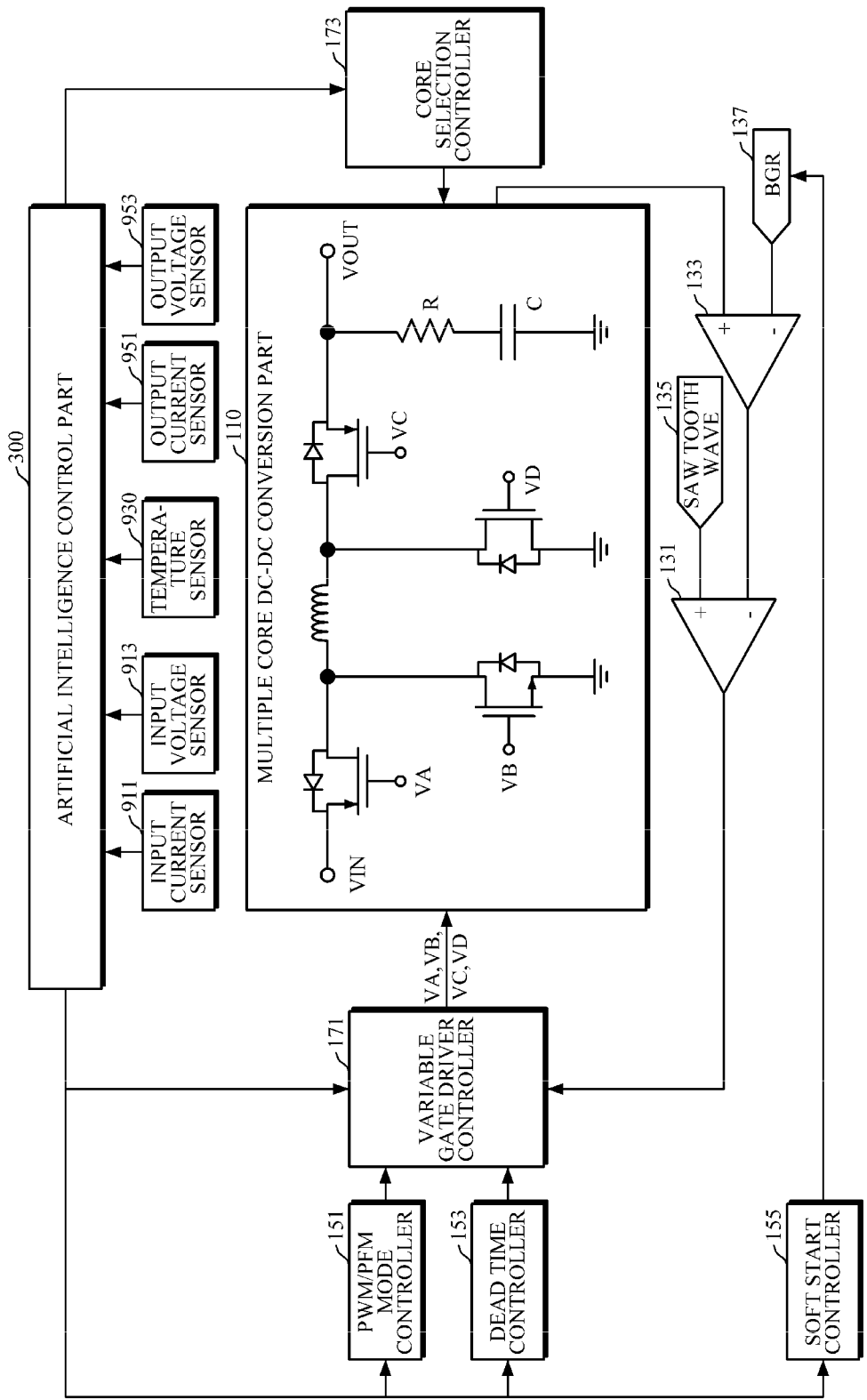
FIG. 7 is a block diagram illustrating a configuration of another embodiment of the DC-DC conversion apparatus to which the artificial intelligence control part according to the present disclosure is applied.

FIG. 7 is a block diagram illustrating a configuration of another embodiment of the DC-DC conversion apparatus to which the artificial intelligence control part according to the present disclosure is applied. The shown DC-DC conversion apparatus includes a multiple core DC-DC conversion part 110. That is, a plurality of sets of core circuits of the DC-DC conversion apparatus each including main switching transistors, an inductor, and an output circuit are included. The artificial intelligence control part 300 implemented according to the aspects of the present disclosure detects a current and a voltage of an input terminal $V_{IN}$ through an input current sensor 911 and an input voltage sensor 913. Further, the artificial intelligence control part 300 detects a current and a voltage of an output terminal $V_{OUT}$ through an output current sensor 951 and an output voltage sensor 953. In this case, the current sensors may include a temperature compensation circuit. In one embodiment, the artificial intelligence control part 300 may sense a temperature through a temperature sensor 930 and reflect the temperature in control.

The artificial intelligence control part 300 implemented according to the aspects of the present disclosure outputs, for example, the core selection word in the above-described embodiment, to a core selection controller 173 to select one of a plurality of core circuits. In this case, the artificial intelligence control part 300 selects a gate driver suitable for driving the main switching transistors through a variable gate driver controller 171. Further, the artificial intelligence control part 300 outputs a control word to a PWM/PFM mode controller 151 to control selection between the two operation modes and outputs the control word to a dead time controller 153 to control to select an optimal dead time. In addition, stability of an operation may be improved through a flexible start operation by outputting the control word to a soft start controller 155 and controlling a band gap reference voltage 137.

According to the present disclosure, complicated inputs of a DC-DC converter can be simultaneously processed to satisfy design goals or system demands. Further, fixed process latency which increases in proportion to the number of considered output parameters can be avoided through a method of simultaneously processing numerous output parameters. Accordingly, since high-speed control can be performed, precision for an optimum value can be improved. Further, it is possible to satisfy demands of a system in which efficiency, a settling time, and an output ripple can have conflict with each other. Furthermore, it is possible to satisfy a dynamically changing demanded condition in the system.

In the above description, the present disclosure is described through the embodiment referring to the accompanying drawings but is not limited thereto, and the present disclosure should be interpreted to include various modified examples which may be clearly derived by those skilled in the art. The claims are intended to include these modified examples.

What is claimed is:

1. A direct current (DC)-DC conversion apparatus comprising:
   a power conversion part;
   a plurality of sensors configured to detect a state of each portion of the power conversion part; and
   an artificial intelligence control part configured to sample values output from the plurality of sensors for a predetermined time to generate two-dimensional state information, and process the two-dimensional state information by a convolutional neural network to output a plurality of control signals which control an operation of the power conversion part according to classified result values.

2. The DC-DC conversion apparatus of claim 1, wherein at least one of the plurality of control signals is an increase or decrease signal for a value of a current control signal.

3. The DC-DC conversion apparatus of claim 1, wherein the artificial intelligence control part includes an image information generating part configured to sample the values output from the plurality of sensors for the predetermined time to generate the two-dimensional state information, a convolutional neural network circuit part configured to process the two-dimensional state information to output the classified result values, and an output signal generating part configured to generate the plurality of control signals which control the operation of the power conversion part from the classified result values.

4. The DC-DC conversion apparatus of claim 1, further comprising:
   a configuration information memory in which at least one two-dimensional filter and artificial neural network weighting coefficients are stored; and a control selection part configured to apply a set of the corresponding two-dimensional filter and artificial neural network weighting coefficients from the configuration information memory to the convolutional neural network circuit part in response to a setting instruction.

5. The DC-DC conversion apparatus of claim 4, further comprising an operation mode determination part configured to determine an operation mode from an output of the plurality of sensors to output the setting instruction.

6. The DC-DC conversion apparatus of claim 3, wherein the artificial intelligence control part further includes a radial basis function neural network (RBFNN) circuit part, and an intelligent network engine selection part which controls so that the generated two-dimensional state information is processed by the radial basis function neural network in the case of previously learned state information and is processed by the convolutional neural network in the case of new state information.

7. The DC-DC conversion apparatus of claim 1, wherein the plurality of sensors include an input voltage sensor configured to detect an input voltage of the power conversion part, an input current sensor configured to detect an input current of the power conversion part, an output voltage sensor configured to detect an output voltage of the power conversion part, and an output current sensor configured to detect an output current of the power conversion part.

8. The DC-DC conversion apparatus of claim 1, wherein the control signals generated by the control signal generating part include a duty control signal which controls a duty during a pulse width operation of the power conversion part, and a switching frequency control signal which controls a switching frequency of the power conversion part.

9. The DC-DC conversion apparatus of claim 7, wherein the control signals generated by the control signal generating part further include a core selection signal which selects a core of the power conversion part from the classified result values, a gate driver selection signal which selects a gate driver of the power conversion part, a dead time control signal which controls a dead time of the power conversion part, and a mode selection signal which selects one of a pulse width modulation (PWM) operation mode and a pulse frequency modulation (PFM) operation mode of the power conversion part.

* * * * *